(12) United States Patent
Quek et al.

(10) Patent No.: US 7,936,132 B2
(45) Date of Patent: May 3, 2011

(54) LED LAMP

(75) Inventors: Eng Hwee Quek, Singapore (SG); Mark R. Muegge, Cupertino, CA (US); Gordon Chen, Fremont, CA (US)

(73) Assignee: iWatt Inc., Los Gatos, CA (US)

( * ) Notice: Subject to any disclaimer, the term of this patent is extended or adjusted under 35 U.S.C. 154(b) by 393 days.

(21) Appl. No.: 12/174,389

(22) Filed: Jul. 16, 2008

(65) Prior Publication Data

US 2010/0013409 A1 Jan. 21, 2010

(51) Int. Cl.
*G05F 1/00* (2006.01)
*H05B 37/00* (2006.01)

(52) U.S. Cl. ........................ 315/291; 315/312

(58) Field of Classification Search .............. 315/307, 315/308, 302, 306, 291, 312, 185 R, 185 S
See application file for complete search history.

(56) References Cited

U.S. PATENT DOCUMENTS

| | | | |
|---|---|---|---|
| 5,457,450 A | 10/1995 | Deese et al. | |
| 6,028,776 A * | 2/2000 | Ji et al. | 363/21.05 |
| 6,577,512 B2 * | 6/2003 | Tripathi et al. | 363/21.17 |
| 6,788,011 B2 | 9/2004 | Mueller et al. | |
| 7,038,399 B2 | 5/2006 | Lys et al. | |
| 7,064,498 B2 | 6/2006 | Dowling et al. | |
| 7,186,003 B2 | 3/2007 | Dowling et al. | |
| 7,274,160 B2 * | 9/2007 | Mueller et al. | 315/312 |
| 7,352,138 B2 | 4/2008 | Lys et al. | |
| 7,358,679 B2 | 4/2008 | Lys et al. | |
| 2002/0113558 A1 | 8/2002 | Buell et al. | |
| 2003/0102819 A1 | 6/2003 | Min et al. | |
| 2004/0233144 A1 | 11/2004 | Rader et al. | |
| 2005/0156635 A1 | 7/2005 | Yoneyama et al. | |
| 2006/0006821 A1 | 1/2006 | Singer et al. | |
| 2007/0139317 A1 | 6/2007 | Martel et al. | |
| 2007/0159008 A1 | 7/2007 | Bayat et al. | |
| 2007/0182338 A1 | 8/2007 | Shteynberg et al. | |
| 2007/0188114 A1 | 8/2007 | Lys et al. | |
| 2007/0262724 A1 | 11/2007 | Mednik et al. | |
| 2008/0018261 A1 * | 1/2008 | Kastner | 315/192 |
| 2008/0116818 A1 | 5/2008 | Shteynberg et al. | |
| 2008/0150450 A1 * | 6/2008 | Starr et al. | 315/294 |
| 2008/0150452 A1 | 6/2008 | Kung et al. | |

OTHER PUBLICATIONS

PCT International Search Report and Written Opinion, PCT Application No. PCT/US2009/046767, Jul. 30, 2009, seven pages.

(Continued)

*Primary Examiner* — Douglas W Owens
*Assistant Examiner* — Minh D A
(74) *Attorney, Agent, or Firm* — Fenwick & West LLP

(57) ABSTRACT

An LED lamp is provided in which the output light intensity of the LEDs in the LED lamp is adjusted based on the input voltage to the LED lamp. The LED lamp comprises one or more LEDs, and an LED driver configured to receive an input voltage and provide regulated current to said one or more LEDs, where the LED driver is configured to adjust the regulated current to said one or more LEDs according to the input voltage to adjust the output light intensity of said one or more LEDs. The LED lamp can be a direct replacement of conventional incandescent lamps in typical wiring configurations found in residential and commercial building lighting applications that use conventional dimmer switches that carry out dimming by changing the input voltage to the LED lamp.

11 Claims, 15 Drawing Sheets

OTHER PUBLICATIONS

"Charting a HV9931 Driver Design," DN-H04, 2007, Supertex Inc., [online] [Retrieved on May 29, 2008] Retrieved from the internet <URL:http://www.supertex.com/pdf/app_notes/DN-H04.pdf>.

"HV9931 Unity Power Factor LED Lamp Driver," AN-H52, 2007, Supertex Inc., [online] [Retrieved on May 29, 2008] Retrieved from the internet <URL:http://www.supertex.com/pdf/app_notes/AN-H52.pdf>.

"56W Off-line LED Driver, 120 VAC with PFC, 160V, 350mA Load, Dimmer Switch Compatible," DN-H05, 2007, Supertex Inc., [online] [Retrieved on May 29, 2008] Retrieved from the internet <URL:http://www.supertex.com/pdf/app_notes/DN-H05.pdf>.

"14W Off-line LED Driver, 120VAC, PFC, 14V, 1A Load," DN-H06, Supertex Inc., 2007, [online] [Retrieved on May 29, 2008] Retrieved from the internet <URL:http://www.supertex.com/pdf/app_notes/DN-H06.pdf>.

"TEA152x family," Product data sheet, NXP Phillips, Jan. 25, 2006, [online] [Retrieved on May 29, 2008] Retrieved from the internet <URL:http://www.nxp.com/acrobat_download/datasheets/TEA152X_FAM_2.pdf>.

"NXP AC/DC converter for LED luminaires," NXP Phillips, Jan. 2008, [online] [Retrieved on May 29, 2008] Retrieved from the internet <URL:http://www.nxp.com/acrobat_download/literature/9397/75016259.pdf>.

* cited by examiner

LED LAMP

BACKGROUND OF THE INVENTION

1. Field of the Invention

The present invention relates to driving LED (Light-Emitting Diode) lamps and, more specifically, to dimming the LED lamps.

2. Description of the Related Arts

LEDs are being adopted in a wide variety of electronics applications, for example, architectural lighting, automotive head and tail lights, backlights for liquid crystal display devices, flashlights, etc. Compared to conventional lighting sources such as incandescent lamps and fluorescent lamps, LEDs have significant advantages, including high efficiency, good directionality, color stability, high reliability, long life time, small size, and environmental safety.

The use of LEDs in lighting applications is expected to expand, as they provide significant advantages over incandescent lamps (light bulbs) in power efficiency (lumens per watt) and spectral quality. Furthermore, LED lamps represent lower environmental impact compared to fluorescent lighting systems (fluorescent ballast combined with fluorescent lamp) that may cause mercury contamination as a result of fluorescent lamp disposal.

However, conventional LED lamps cannot be direct replacements of incandescent lamps and dimmable fluorescent systems without modifications to current wiring and component infrastructure that have been built around incandescent light bulbs. This is because conventional incandescent lamps are voltage driven devices, while LEDs are current driven devices, requiring different techniques for controlling the intensity of their respective light outputs.

FIG. 1 illustrates the operating characteristics of conventional incandescent lamps. As shown in FIG. 1, the amount of light produced in an incandescent lamp is proportional to the $3.4^{th}$ power of the ratio of the Root-Mean-Square (RMS) input voltage, which is the square root of the mean value of the square of the instantaneous input voltage to the incandescent lamp. Thus, if the RMS voltage is reduced by one half ($\frac{1}{2}$), the light output is reduced to $(\frac{1}{2})^{3.24}$ or about one-tenth ($\frac{1}{10}$). In short, the amount of light produced is positively proportional to the RMS input voltage.

FIG. 2 illustrates a typical dimmer wiring configuration in conventional residential and commercial lighting applications. Predominantly, incandescent lamps operate off of alternating current (AC) systems. Specifically, a dimmer switch 10 is placed in series with an input voltage source 15 and the incandescent lamp 20. The dimmer switch 10 receives a dimming input signal 25, which sets the desired light output intensity of incandescent lamp 20. Control of light intensity of the incandescent lamp 20 is achieved by adjusting the RMS voltage value of the lamp input voltage (V-RMS) 30 that is applied to incandescent lamp 20. Dimming input signal 25 can either be provided manually (via a knob or slider switch) or via an automated lighting control system.

Many dimmer switches adjust the V-RMS by controlling the phase angle of the AC-input power that is applied to the incandescent lamp to dim the incandescent lamp. Phase angle control can be provided by switching devices such as a TRIAC device. FIGS. 3A, 3B, and 3C illustrate typical lamp input voltage waveforms which are output by dimming switches that employ phase angle switching. FIG. 3A illustrates lamp input voltage 30 when the dimmer switch 10 is set to maximum light intensity, as the voltage signal from the input voltage source 15 is unaffected by the dimmer switch 10. FIG. 3b illustrates lamp input voltage 30 with a slight dimming effect as the dimmer switch 10 eliminates partial sections 32 of the input voltage source 15. FIG. 3C illustrates lamp input voltage 30 with an increased dimming effect by further increasing the portions 34 of the input voltage source 15 that is switched by dimmer switch 10. Controlling the phase angle is a very effective and simple way to adjust the RMS-voltage supplied to the incandescent bulb and provide dimming capabilities.

However, conventional dimmer switches that control the phase angle of the input voltage are not compatible with conventional LED lamps, since LEDs, and thus LED lamps, are current driven devices. Light output from the LED lamp depends on the current through the LEDs. FIG. 4 illustrates the operating characteristics of a conventional LED. As shown in FIG. 4, the luminous flux (in lumens) from the LED increases as the LED's forward current (in mA) increases.

FIG. 5 illustrates a conventional LED lamp installed in a conventional dimmer wiring configuration in residential and commercial applications, similar to that illustrated in FIG. 2. Typically, LED lamps that are connected directly to AC power contain a current regulation control circuit to control the forward current through the LEDs. Referring to FIG. 5, LED lamp 50 is connected in series to AC input voltage source 15 through dimmer switch 10, and includes LED device(s) 51 and LED driver(s) 52. LED driver 52 monitors and regulates the forward current 53 of LED 51 and provides a constant current source over an input voltage range. Even if dimmer switch 10 adjusts the lamp input voltage 57 to the LED lamp 50 in response to dimming input signal 25, LED driver 52 maintains a fixed forward current 53 through LED 51. Thus, conventional LED lamps 50 may have only a fixed light intensity output from the LED lamp 50 over a variable range of the lamp input voltage 57. Thus, conventional LED lamps 50 may not be dimmed using conventional dimmer switches 10 as shown in FIG. 5, commonly found in typical residential and commercial settings.

SUMMARY OF THE INVENTION

Embodiments of the present invention include an LED lamp in which the output light intensity of the LEDs in the LED lamp is adjusted based on the input voltage to the LED lamp. The LED lamp input voltage is sensed and the output light intensity of the LEDs is adjusted by controlling the forward current of the LED(s) according to the sensed lamp input voltage. In one embodiment, a light-emitting diode (LED) lamp comprises one or more LEDs, and an LED driver configured to receive an input voltage and provide regulated current to said one or more LEDs, where the LED driver is configured to adjust the regulated current to said one or more LEDs according to the input voltage to adjust the output light intensity of the one or more LEDs.

The LED lamp according to various embodiments of the present invention has the advantage that the LED lamp can be a direct replacement of conventional incandescent lamps in typical wiring configurations found in residential and commercial building lighting applications, and that the LED lamp can be used with conventional dimmer switches that carry out dimming by changing the input voltage. In addition, galvanic isolation is provided between the AC input voltage and the LED elements.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1:
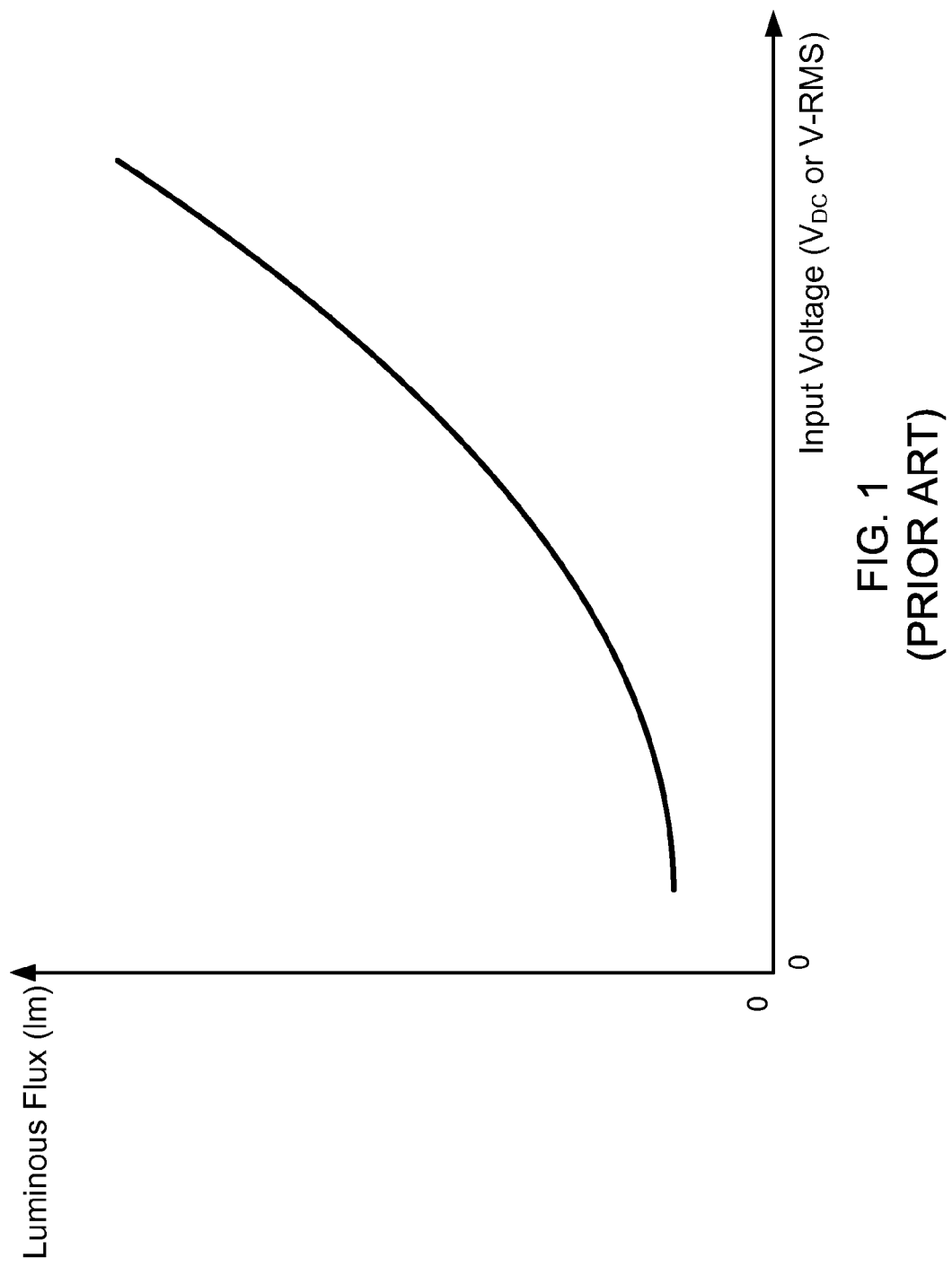
FIG. 1 illustrates the operating characteristics of conventional incandescent lamps.
Figure 2:
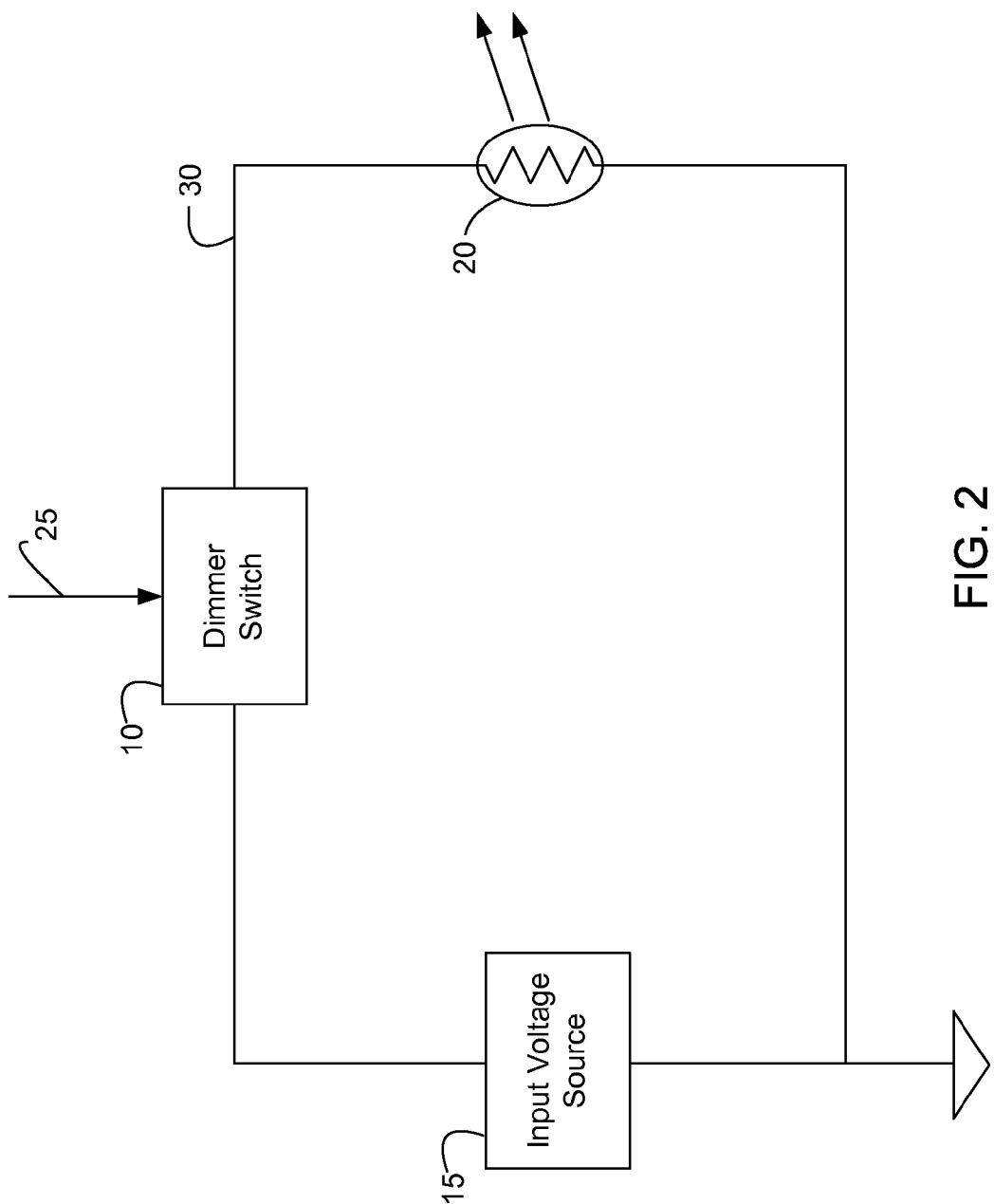
FIG. 2 illustrates a typical dimmer wiring configuration in conventional residential and commercial lighting applications.

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

As will be explained in more detail below with reference to the figures, the LED lamp system and a method according to various embodiments of the present invention (1) detects the operating input voltage to the LED lamp and its waveform shape (phase angle switching), (2) generates a dimming factor signal based on the input voltage, (3) provides corresponding output drive current to the LEDs in the LED lamp based on the dimming factor signal. The LED lamp system may also provide galvanic isolation between the AC input voltage means and the LED elements, and be installed in parallel with a plurality of dimmable LED lamps and/or incandescent lamps. In this regard, the LED lamp detects the AC phase switching of the AC input waveform to the LED lamp, and uses this information to create a dimming factor signal. The dimming factor signal is input to LED drivers, which use the dimming factor signal to calculate the appropriate LED drive current to LED elements. Thus, the LED drive current is generated based on the dimming factor signal, and not directly based on the V-RMS value of the AC input voltage to the LED lamp. This allows the LED lamp to "behave" like incandescent lamps (bulbs) for purposes of dimming (e.g., to follow the incandescent voltage/intensity curve), and be installed in typical residential and commercial settings that use conventional dimmer switches.

The brightness of the LEDs in the LED lamps may be controlled by pulse-width-modulation (PWM) or constant current control. In PWM, the output drive current to the LED is essentially at a fixed level, and it is turned on-and-off at a high rate. In this manner, the average output drive current is equal to the duty cycle "D" (the percentage of time that the output drive current is on in a cycle) multiplied by the input current. The duty cycle D can be varied from 0% (resulting in 0 Amps average output drive current) all the way to 100% (average LED output drive current=input current). The PWM setting is determined based on the desired light output intensity as set by the dimmer setting. The light produced by the LED is proportional to the average output drive current outlined in the operating characteristics described, for example, in FIG. 4. Applying a 50% duty cycle PWM signal to an LED will produce approximately ½ of the light that the LED produces when 100% duty cycle is applied.

Figure 6:
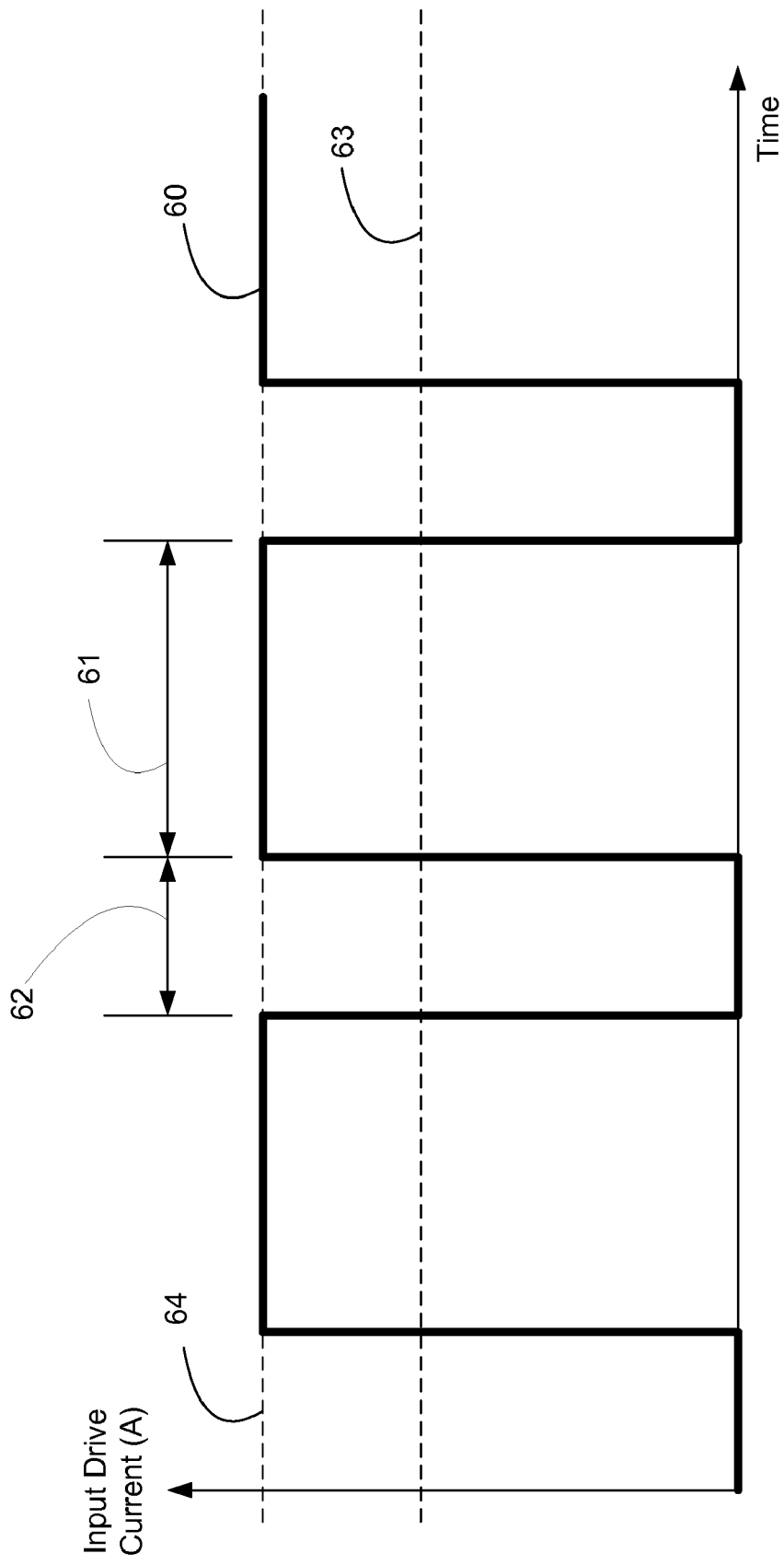
FIG. 6 illustrates input current drive waveforms for dimming an LED via pulse width modulation, according to one embodiment of the present invention.

FIG. 6 illustrates input current drive waveforms for dimming an LED via pulse width modulation (PWM), according to one embodiment of the present invention. Input current 64 is provided to the LED during t-ON times 61, and no input current is provided to the LED during t-OFF times 62. The average LED current 63 (corresponding to the light output intensity as described in FIG. 4) as produced by LED drive signal 60 is determined as follows:

$$I_{Average\ LED}[63]=(t_{ON}[61]/(t_{OFF}[62]+t_{ON}[61]))\times I_{INPUT}[64]$$

Figure 4:
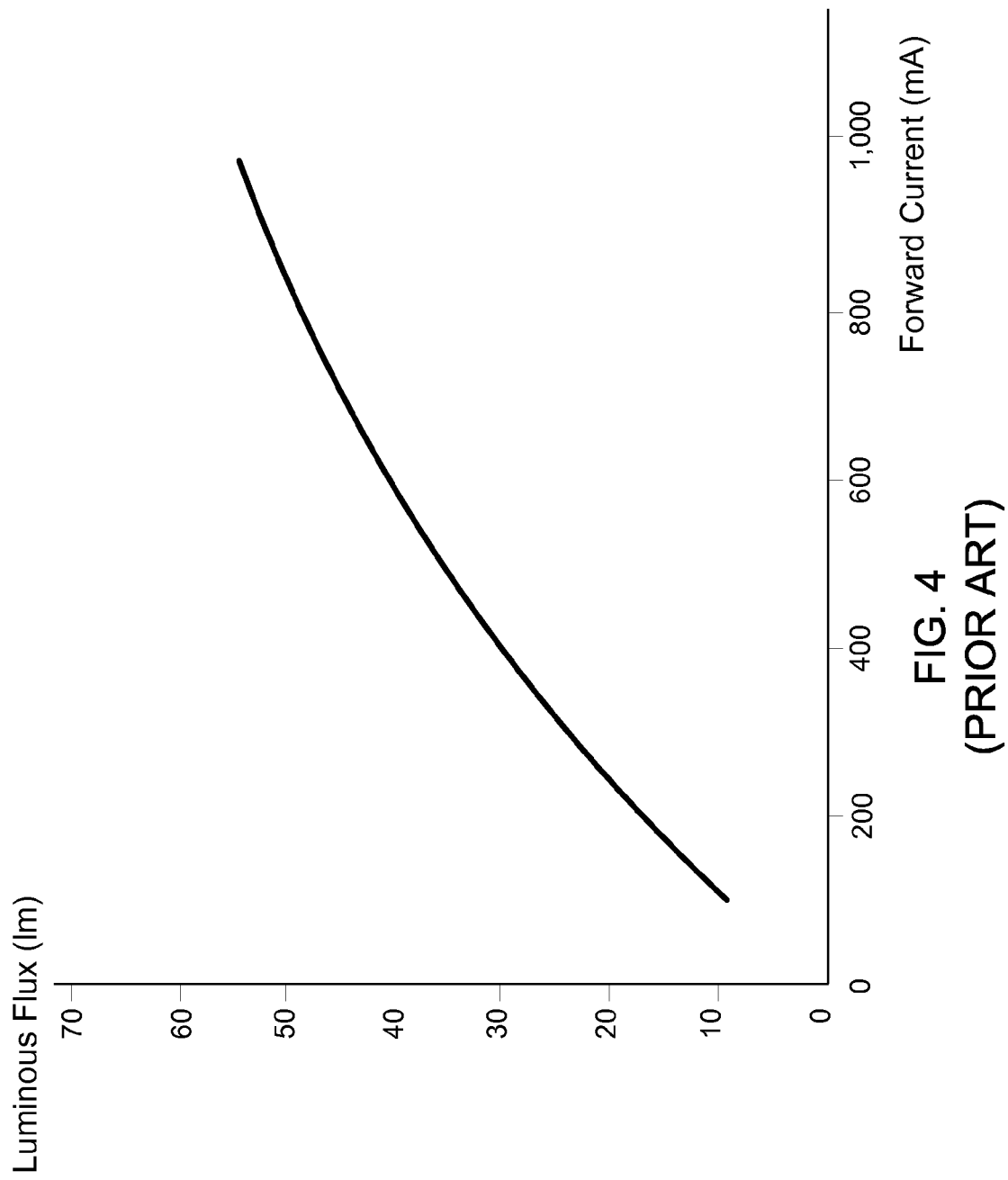
FIG. 4 illustrates the operating characteristics of a conventional LED.
Figure 5:
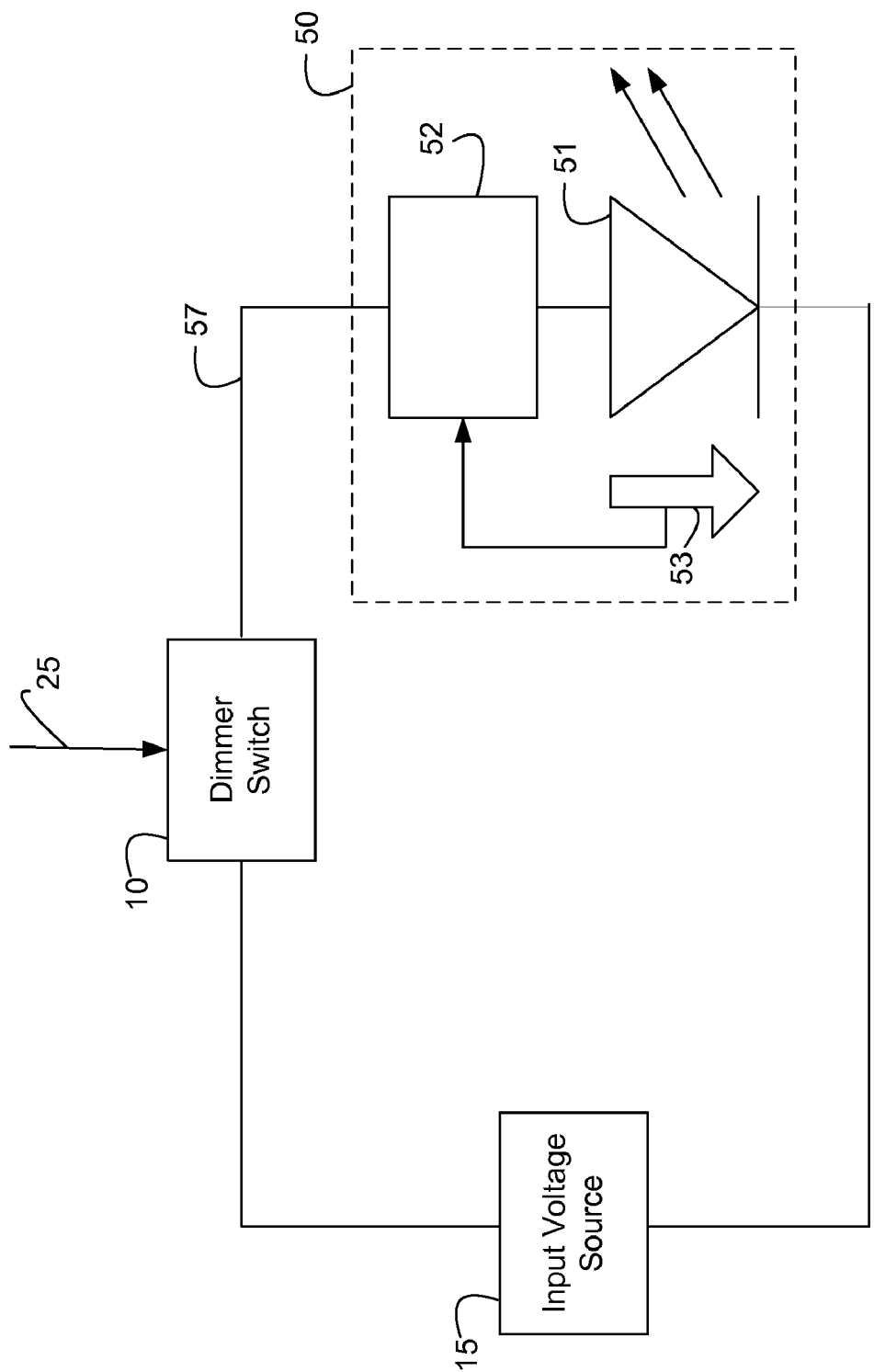
FIG. 5 illustrates a conventional LED lamp installed in a conventional dimmer wiring configuration in residential and commercial applications, similar to that illustrated in FIG. 2.

In constant current drive, a fixed LED current is provided to the LED. The level of that constant current is set based on the desired light output intensity as set by the dimmer setting. A constant current drive is provided to the LED over an operating voltage range, and the light output intensity is not affected by the change in operating voltage. Dimming is achieved by shifting the constant current setting based on the desired light output intensity as set by the dimmer setting (corresponding to the light output intensity as illustrated in FIG. 4)

Figure 7:
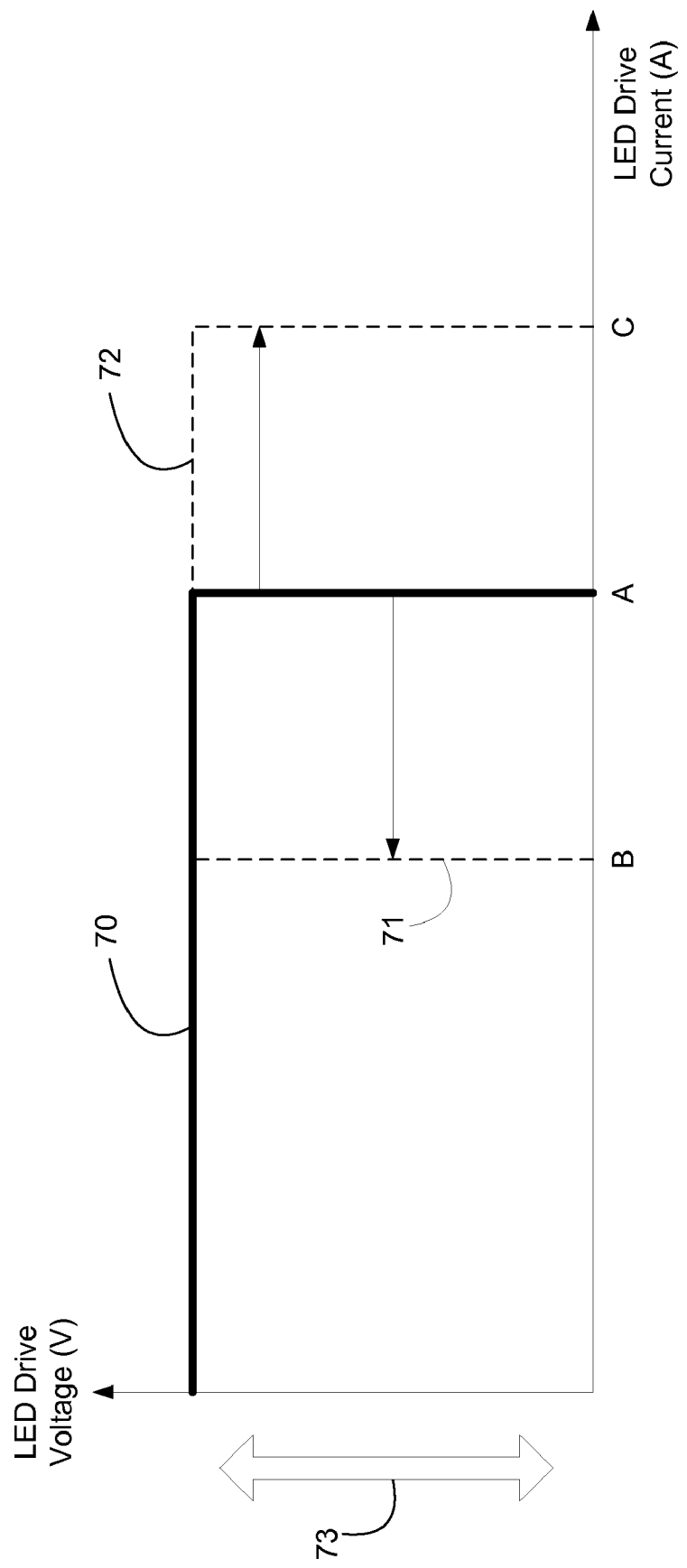
FIG. 7 illustrates the V-I characteristics of the LED dimmed under constant current control, according to one embodiment of the present invention.

FIG. 7 illustrates the V-I characteristics of the LED dimmed under constant current control, according to one embodiment of the present invention. As shown in FIG. 7, LED drive signal 70 maintains a V-I characteristic that maintains a fixed output drive current over the operating voltage range 73 of the LED. Constant current value "A" corresponds to a desired light output intensity as indicated by a dimmer setting. If a lower light output intensity is desired, the constant current setting can be reduced, as represented by "B" and LED drive signal 71. If a higher light output intensity is desired, the constant current setting can be increased, as represented by "C" and LED drive signal 72.

Figure 8A:
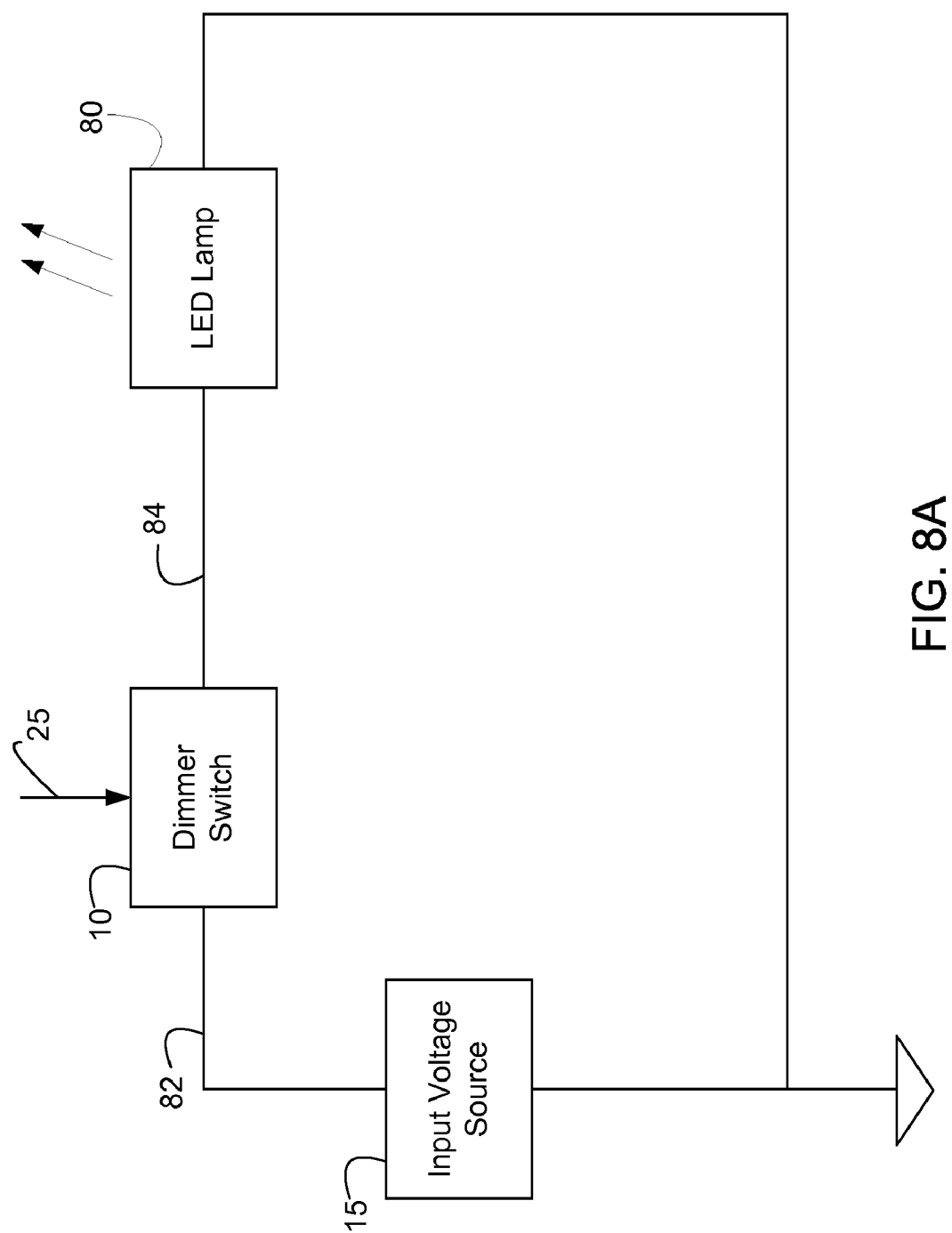
FIG. 8A illustrates an LED lamp system including an LED lamp according to one embodiment of the present invention, used with a conventional dimmer switch.

FIG. 8A illustrates an LED lamp system including an LED lamp according to one embodiment of the present invention, used with a conventional dimmer switch. LED lamp 80 according to various embodiments of the present invention is a direct replacement of an incandescent lamp in a conventional typical dimmer switch setting. A conventional dimmer switch 10 is placed in series with input voltage source 15 and LED lamp 80. Dimmer switch 10 is a conventional one, and receives a dimming input signal 25, which is used to set the desired light output intensity of LED lamp 80. Dimmer switch 10 receives the AC input voltage signal 82 and adjusts the V-RMS value of the lamp input voltage 84 in response to dimming input signal 25. In other words, control of light intensity of LED lamp 80 by the dimmer switch 10 is achieved by adjusting the V-RMS value of the lamp input voltage 84 that is applied to LED lamp 80, in a conventional manner. However, because of the LED lamp 80 according to embodiments of the present invention, the light output intensity of LED lamp 80 can be varied positively to the lamp input voltage 84, exhibiting behavior to incandescent lamps, even though LEDs are current-driven devices and not voltage driven devices. Dimming input signal 25 can either be provided manually (via a knob or slider switch, not shown herein) or via an automated lighting control system (not shown herein).

Figure 3A:
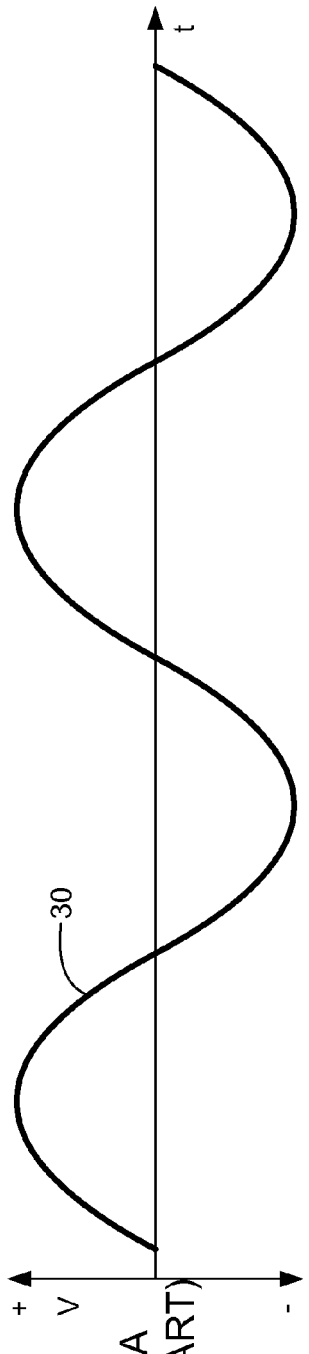
FIGS. 3A, 3B, and 3C illustrate typical lamp input voltage waveforms which are output by dimming switches that employ phase angle switching.
Figure 3B:
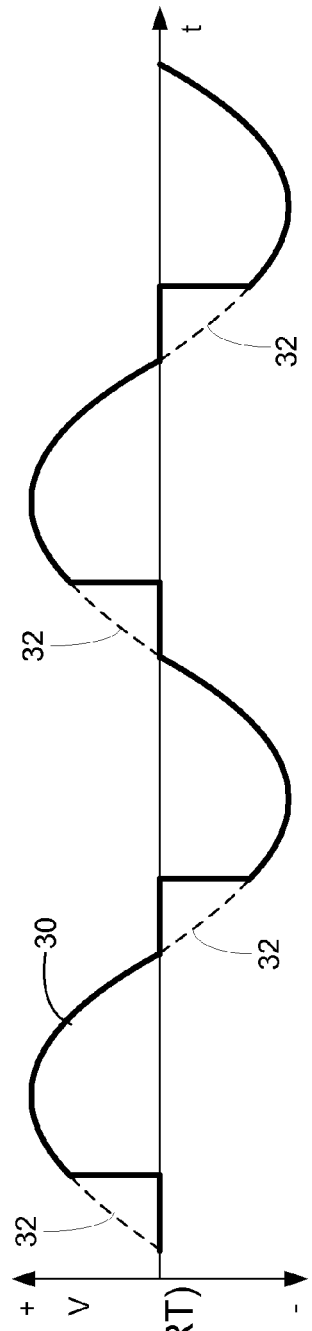
Figure 3C:
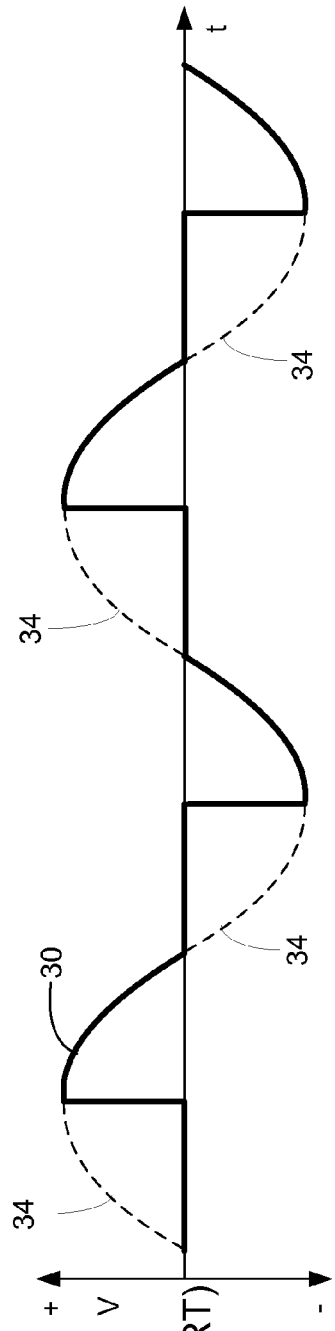
Figure 8B:
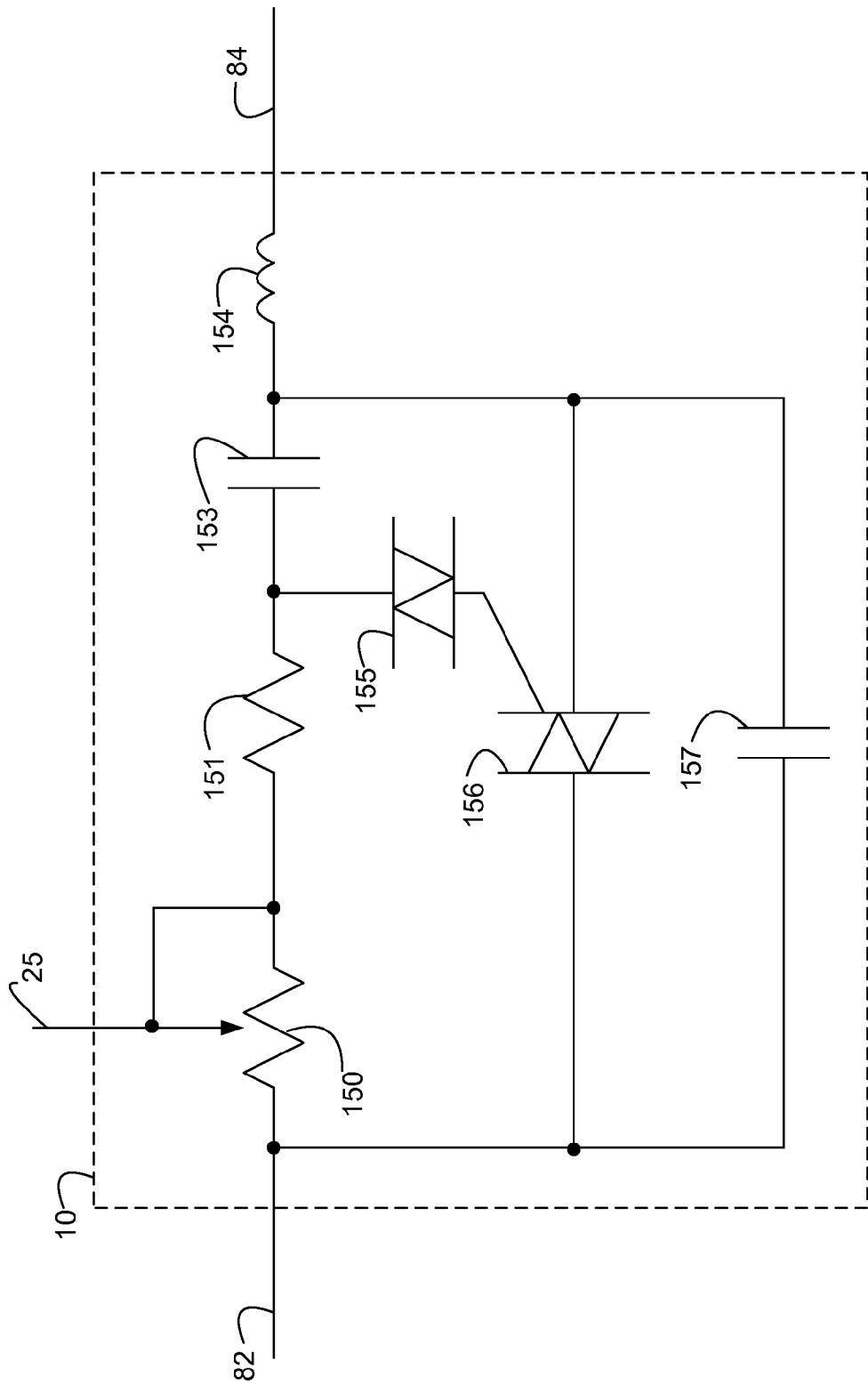
FIG. 8B illustrates the circuit of a conventional dimmer switch.
Figure 10A:
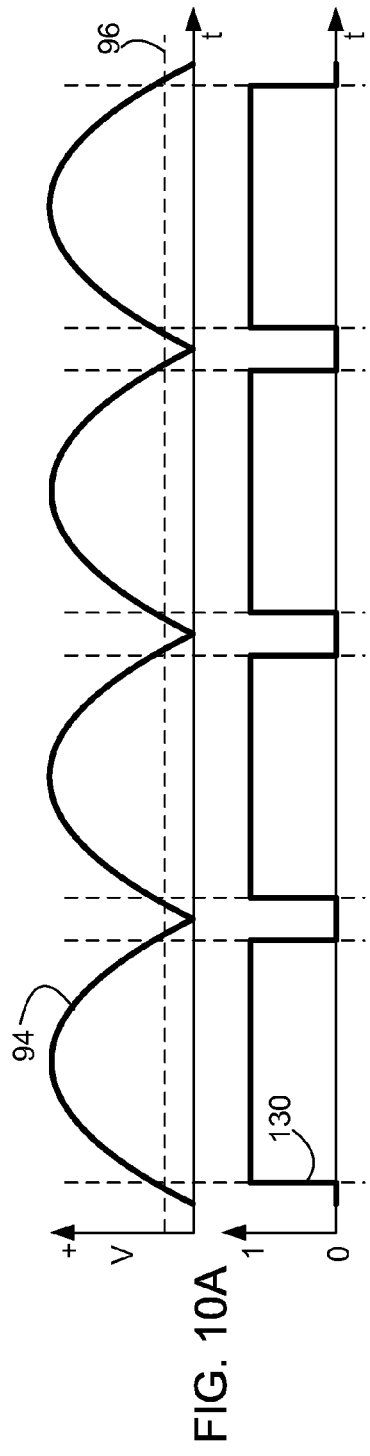
FIGS. 10A, 10B, 10C illustrate the waveforms of the sense output signal to the dimming factor circuit in response to the lamp input voltage subject to various phase angle switching for dimming, according to one embodiment of the present invention.
Figure 10B:
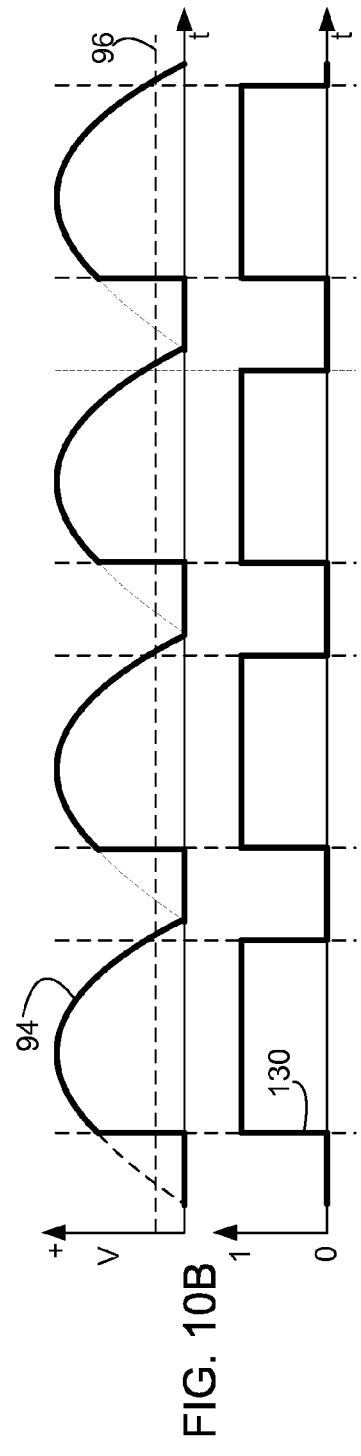
Figure 10C:
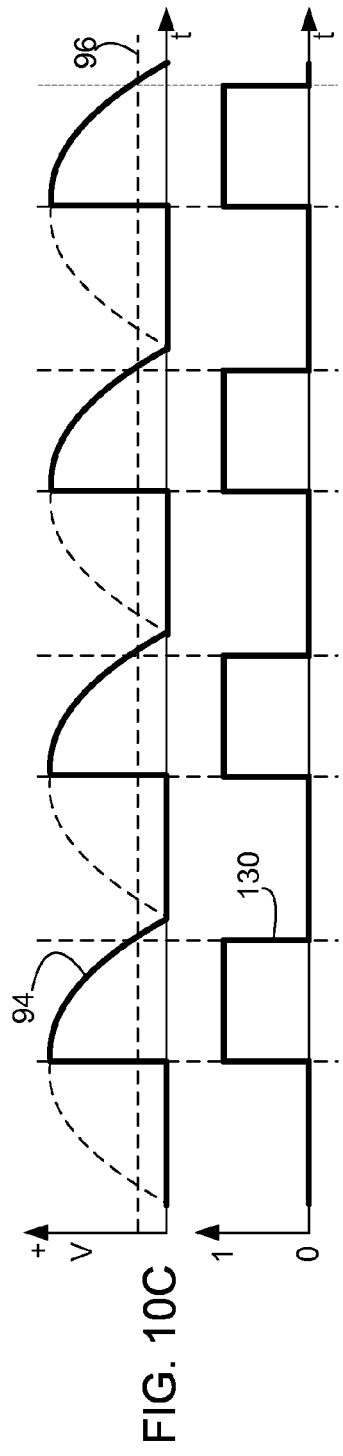

In the embodiments shown herein, it will be assumed that dimmer switch 10 employs phase angle switching of the lamp input voltage 84 to adjust the lamp input voltage 84 and achieve dimming of the LED lamp, as illustrated by the waveforms found in FIGS. 3A, 3B, and 3C (or FIGS. 10A, 10B, and 10C). FIG. 8B illustrates the circuit of a conventional dimmer switch. Dimmer switch 10 includes components such as potentiometer resistor (variable resistor) 150, resistor 151, capacitors 153, 157, diac 155, triac 156, and inductor 154.

Triac 156 is triggered relative to the zero crossings of the AC input voltage 82. When the triac 156 is triggered, it keeps conducting until the current passing though triac 156 goes to zero exactly at the next zero crossing if its load is purely resistive, like a light bulb. By changing the phase at which triac 156 is triggered, the duty cycle of the lamp input voltage 84 can be changed. The advantage of triacs over simple variable resistors is that they dissipate very little power as they are either fully on or fully off. Typically triacs causes voltage drop of 1-1.5 V when it passes the load current.

The purpose of the potentiometer 150 and the delay capacitor 153 in a diac 155/triac 156 combination is to delay the firing point of the diac 155 from the zero crossing. The larger the resistance potentiometer 150 plus resistor 151 feeding the delay capacitor 153, the longer it takes for the voltage across the capacitor 153 to rise to the point where the diac 155 fires, turning on triac 156. Filter capacitor 157 and inductor 154 make a simple radio frequency interference filter, without which the circuit would generate much interference because firing of the triac 156 in the middle of the AC phase causes fast rising current surges. Dimming input 25 can be used to adjust potentiometer 150, changing the firing point of diac 155, thus varying the lamp input voltage 84.

Figure 9A:
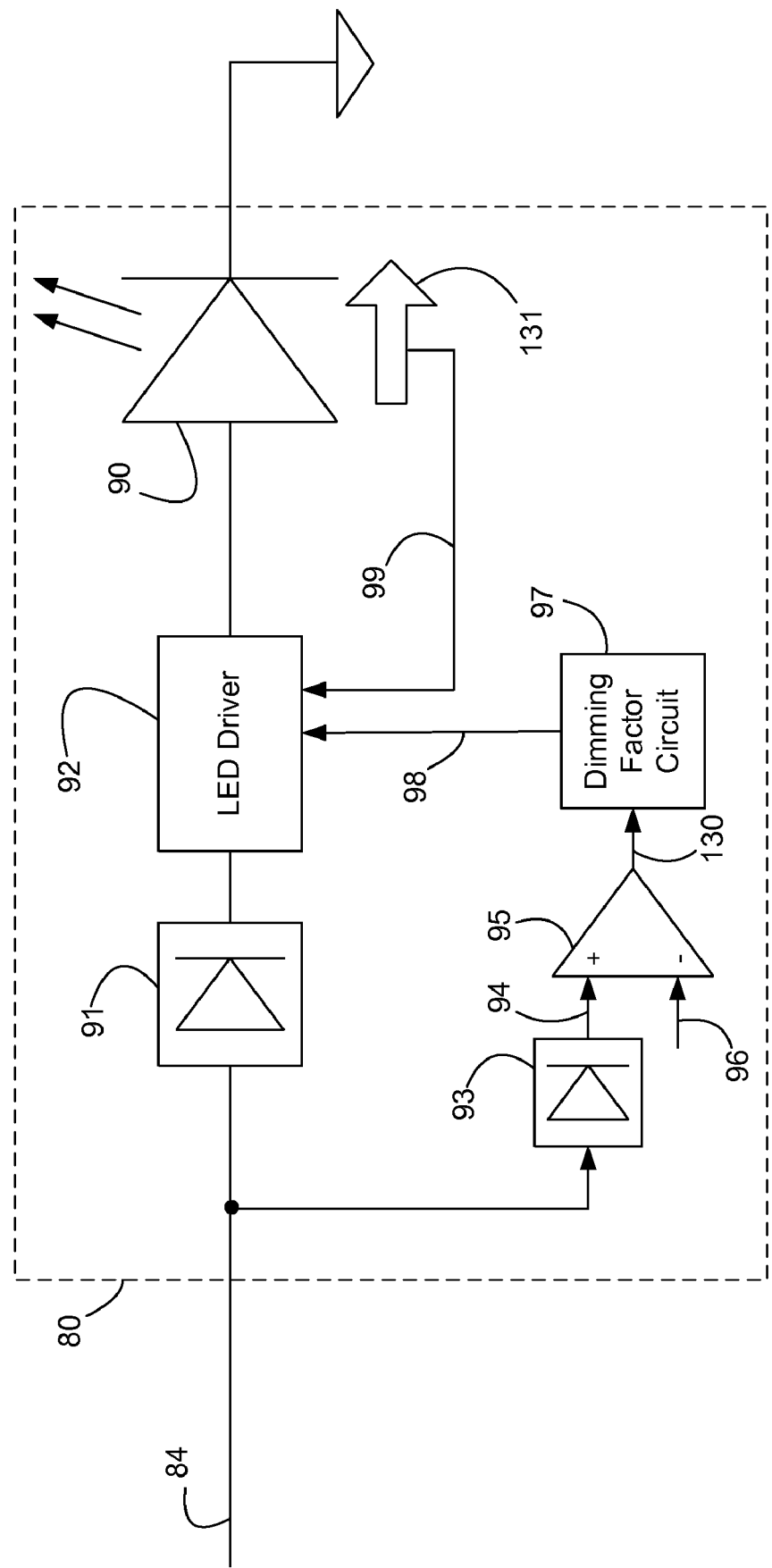
FIG. 9A illustrates the circuit of an LED lamp according to one embodiment of the present invention.

FIG. 9A illustrates the circuit of an LED lamp according to one embodiment of the present invention. LED lamp 80 according to the embodiment of the present invention enables the LED 90 to be dimmed responsive to an adjusted lamp input voltage signal 84, for example, as shown in the waveforms in FIG. 3 generated by a conventional dimmer 10, even though the LED 90 is a current driven device. The LED lamp described in FIG. 9A adjusts the output light intensity of LED 90 by sensing the phase angle switching in lamp input voltage 84. LED lamp 80 includes power bridge rectifier 91, LED driver 92, LED 90, signal bridge rectifier 93, sense device 95 (comparator herein), and dimming factor circuit 97. Although one LED 90 and one LED driver 92 are shown in the LED lamp 80 of FIG. 9A, LED lamp 80 may include multiple LEDs 90 and multiple LED drivers 92, with each LED driver 92 driving one or more LEDs 90.

Lamp input voltage 84 output by conventional dimmer 10 is input to LED lamp 80. Power bridge rectifier 91 rectifies the lamp input voltage 84, and provides the necessary energy supplied to LED 90 via LED driver 92. Signal bridge rectifier 93 rectifies the lamp input voltage 84 to generate the sense input signal 94, and provides the sense input signal 94 to sense device 95. Sense device 95 is represented as a dual-state comparator herein, but other circuits can also be used, such as an analog to digital converter (ADC). Sense device 95 compares sense input signal 94 to reference voltage 96, generating sense output signal 130. Sense output signal 130 is positive (logic level "1") when sense input signal 94 is greater than reference voltage 96, and is zero (logic level "0") when sense input signal 94 is not greater than reference voltage 96. Such relation is shown in FIGS. 10A, 10B, 10C, which illustrate the waveforms of the sense output signal 130 to the dimming factor circuit 97 in response to the lamp input voltage 94 subject to various phase angle switching for dimming, according to one embodiment of the present invention. As shown in FIGS. 10A, 10B, 10C, as the sense input signal 94 is subject to phase angle switching for dimming in response to the dimming input signal 25 from FIG. 10A further to FIG. 10B and then even further to FIG. 10C, the duty cycle of sense output signal 130 is becomes smaller from FIG. 10A to FIG. 10B and to FIG. 10C.

Referring back to FIG. 9A, sense output signal 130 is input to dimming factor circuit 97. Dimming factor circuit 97 determines the degree of dimming desired as indicated by dimming input signal 25 and reflected in lamp input voltage 84. Dimming factor circuit 97 may employ a number of algorithms to determine the desired amount of dimming, including monitoring the duty-cycle of sense output signal 130. Dimming factor circuit 97 outputs LED drive signal 98 to LED driver 92, which sets the LED drive current 131 setting for LEDs 90. LED driver 92 regulates the LED drive current 131 via drive current feedback signal 99. LED driver 92 can employ PWM or constant current control, as described previously, to achieve the desired light output intensity at LEDs 90.

Figure 9B:
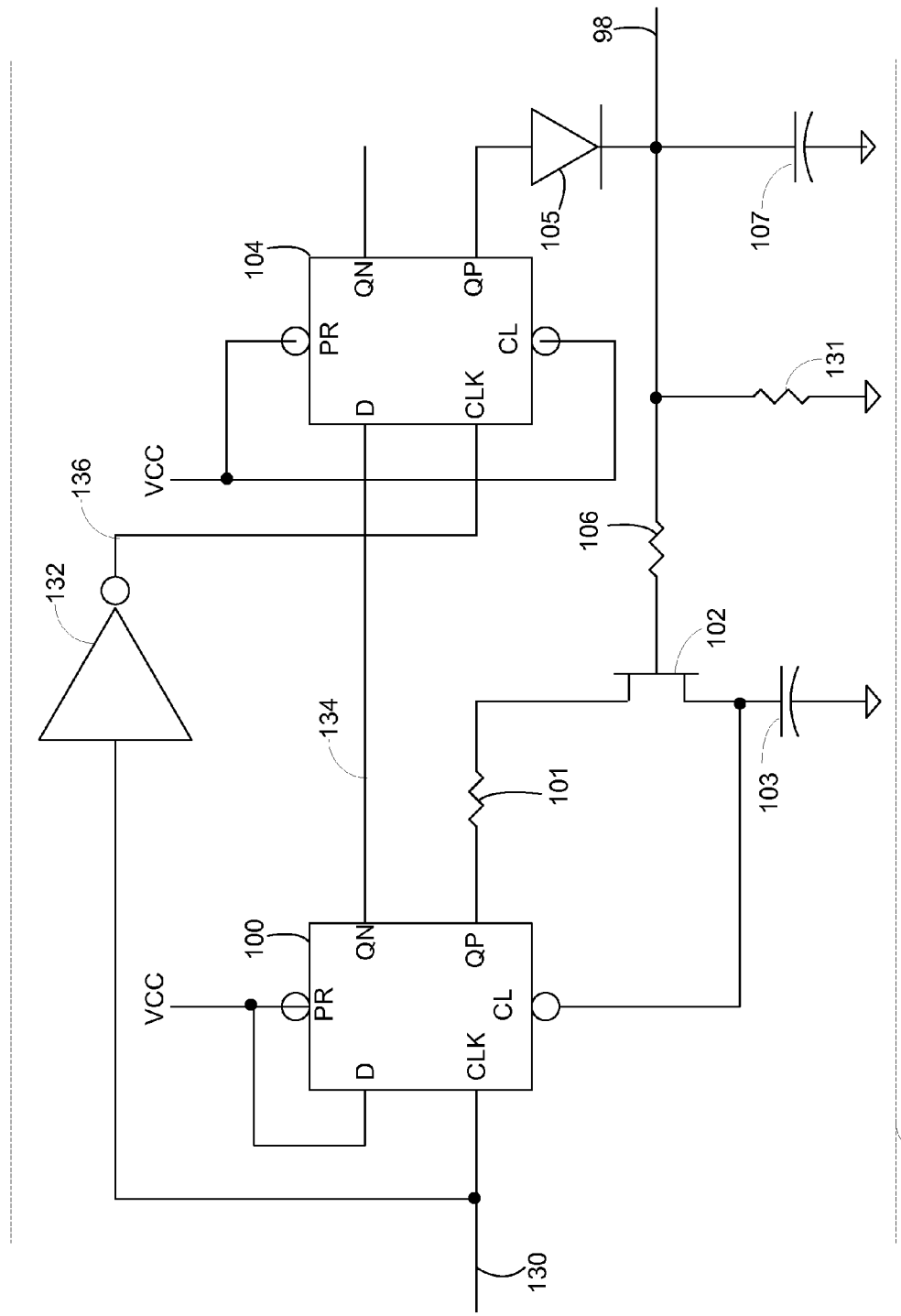
FIG. 9B illustrates the circuit of a dimming factor circuit according to one embodiment of the present invention.

FIG. 9B illustrates the circuit of a dimming factor circuit according to one embodiment of the present invention. Dimming factor circuit 97 can be used to generate an output voltage (LED drive signal) 98 that is proportional to varying lengths of a positive-going pulse in the sense output signal 130 that is input to the dimming factor circuit 97. In this case, the duty cycle of sense output signal 130 varies the voltage of LED drive signal 98. The dimming factor circuit 97 is similar to a phase lock loop, but locks onto a pulse length of the output sense signal 130 instead of the frequency of the incoming signal.

The 74HC/HCT74 is a well known, dual positive-edge triggered D-type flip-flop. The 74HC/HCT74 is used to implement both one-shot multi-vibrator circuit 100 and pulse-width comparator 104. One-shot multi-vibrator circuit 100 receives the output sense signal 130 as its clock (CLK) input. The time constant for one-shot multi-vibrator circuit 100 is set by the time constant resistor 101, the ON-resistance of switch 102, and the time constant capacitor 103. The pulse-width comparator 104 compares the reference pulse 134 from one-shot multi-vibrator circuit 100 with the incoming pulse 136, which is the inverse of sense output signal 130 due to inverter 132. If the QN output 134 of one-shot multi-vibrator circuit 100 is high, the D-input of pulse-width comparator 104 is also high. If one-shot multi-vibrator circuit 100 times out before sense output signal 130 falls, the QN output of one-shot multi-vibrator circuit 100 becomes low, driving the D input of pulse-width comparator 104 low. This drives the QP output of the one-shot multi-vibrator circuit 100 high when the sense output signal 130 falls. The QP output of one-shot multi-vibrator circuit 100 connects to the switch 102 through resistor 101. The QP output of pulse-width comparator 104 connects to the switch 102 through diode 105 and resistor 106. Capacitor 107 filters the QP output of pulse-width comparator 104 to adjust the time constant of one-shot multi-vibrator circuit 100 to match the incoming pulse 130. Resistor 131 is a discharge resistor for capacitor 107 and for switch 102. The QN output of comparator 104 may be left open or connected to a +5V voltage via a pull-up resistor (not shown). Therefore, the voltage across capacitor 107, which is output as LED drive signal 98, is an indication of the incoming pulse width of sense output signal 130. Note that in other embodiments the LED drive signal 98 may also be digitized or otherwise may be generated as a digital signal indicating the incoming pulse width of sense output signal 130.

Figure 10D:
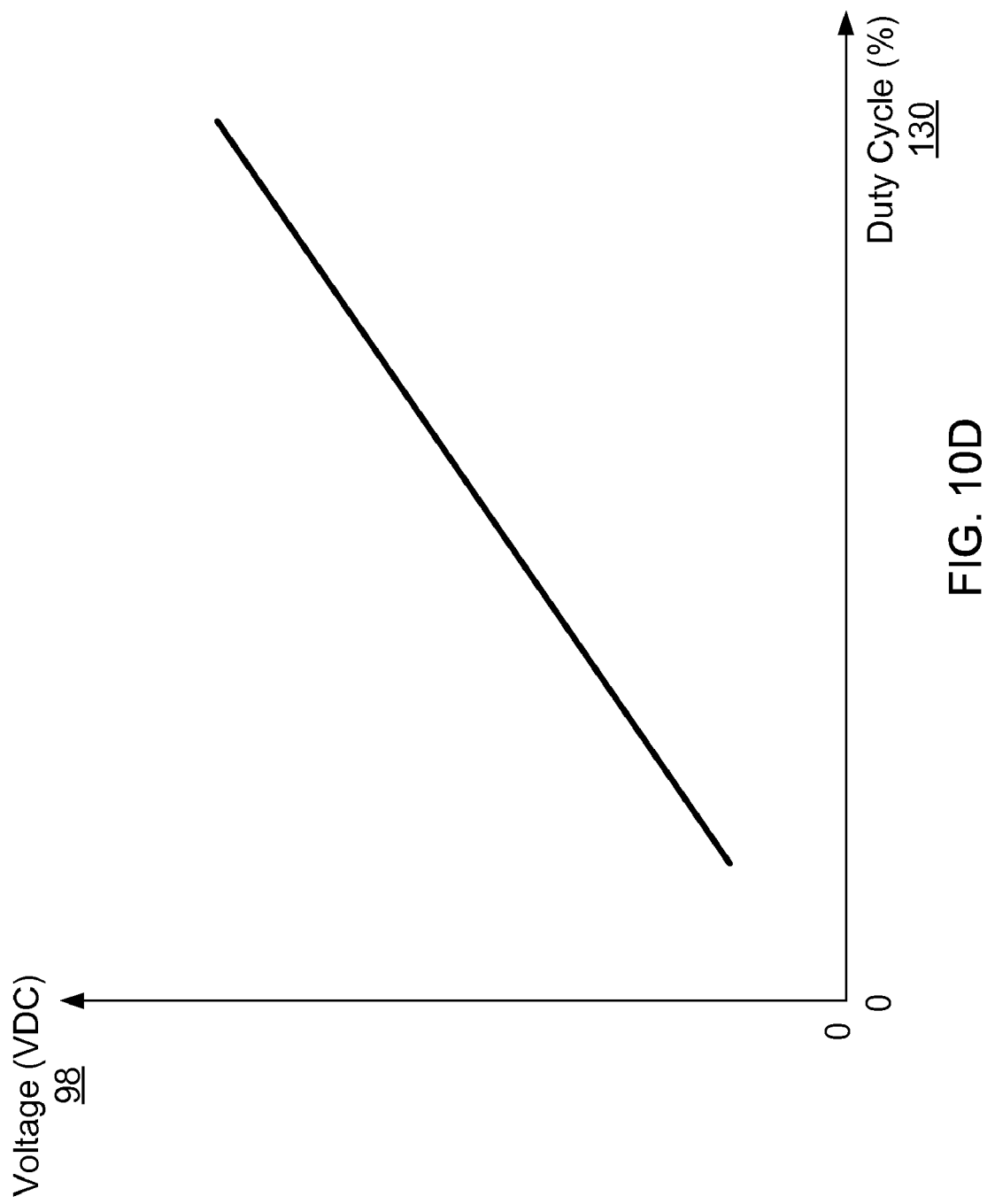
FIG. 10D illustrates the relationship between the sense output signal and the LED drive signal to the LED driver, according to one embodiment of the present invention.

This relationship is also illustrated in FIG. 10D, which illustrates the relationship between the sense output signal 130 and the LED drive signal 98 to the LED driver 92, as generated by dimming factor circuit 97 according to one embodiment of the present invention. As shown in FIG. 10D, dimming factor circuit 97 generates the voltage of the LED drive signal (across capacitor) 98 to be proportional to the duty cycle (incoming pulse width) of the sense output signal 130, which is in turn proportional to the duty cycle of how long the sense input signal 94 is greater than reference voltage 96.

Figure 11:
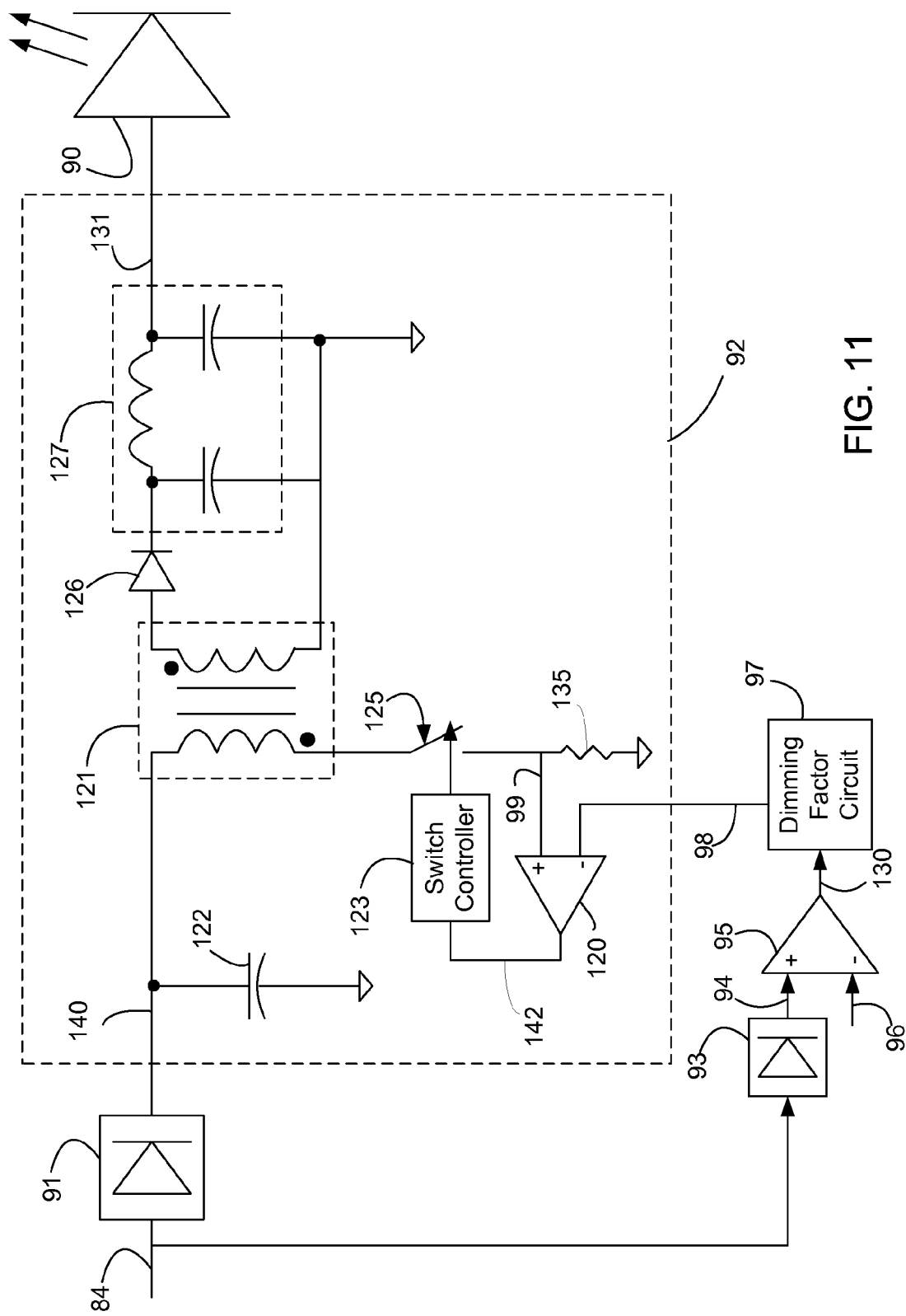
FIG. 11 illustrates the LED driver in more detail, according to one embodiment of the present invention.

FIG. 11 illustrates the LED driver 92 of FIG. 9A in more detail, according to one embodiment of the present invention. LED driver 92 employs a well known flyback topology which operates in a constant current mode of operation. LED driver 92 includes input filter capacitor 122, power transformer 121, rectifier diode 126, output filter circuit 127, switch controller 123, sense resister 135, and comparator 120. Input filter capacitor 122 filters the incoming rectified AC input voltage 140 as output from rectifier 91. Power transformer 121 provides primary to secondary isolation as well as voltage level conversion based on its turns ratio of its primary windings to secondary windings. Rectifier diode 126 and output filter circuit 127 provide the necessary output rectification and DC filtering, respectively, of LED drive signal 128. Power switch 125 provides the control of energy pulses delivered by LED driver 92, and switch controller 123 provides regulation of current delivered to the LED 90 by controlling the duty cycle of the on-times and off-times of power switch 125. Current sense signal 99 provides the current feedback indicating the amount of current 131 being delivered to LED 90, in the form of a voltage across sense resistor 135.

Comparator 120 senses both current sense signal 99 and LED drive signal 98 and compares their voltages, and outputs signal 142. Effectively, LED drive signal 98 which represents the desired dimming factor of LED lamp 80 sets the reference point of comparator 120. As the desired dimming factor is increased, the voltage of LED drive signal 98 is raised. This in turn raises the trip point of the output current 142, thus causing power switch 125 to be have a smaller duty cycle of on-times to off-times, thereby reducing the average current 131 to the LED(s) 90 and its brightness, thereby dimming the LED(s) 90.

Figure 12:
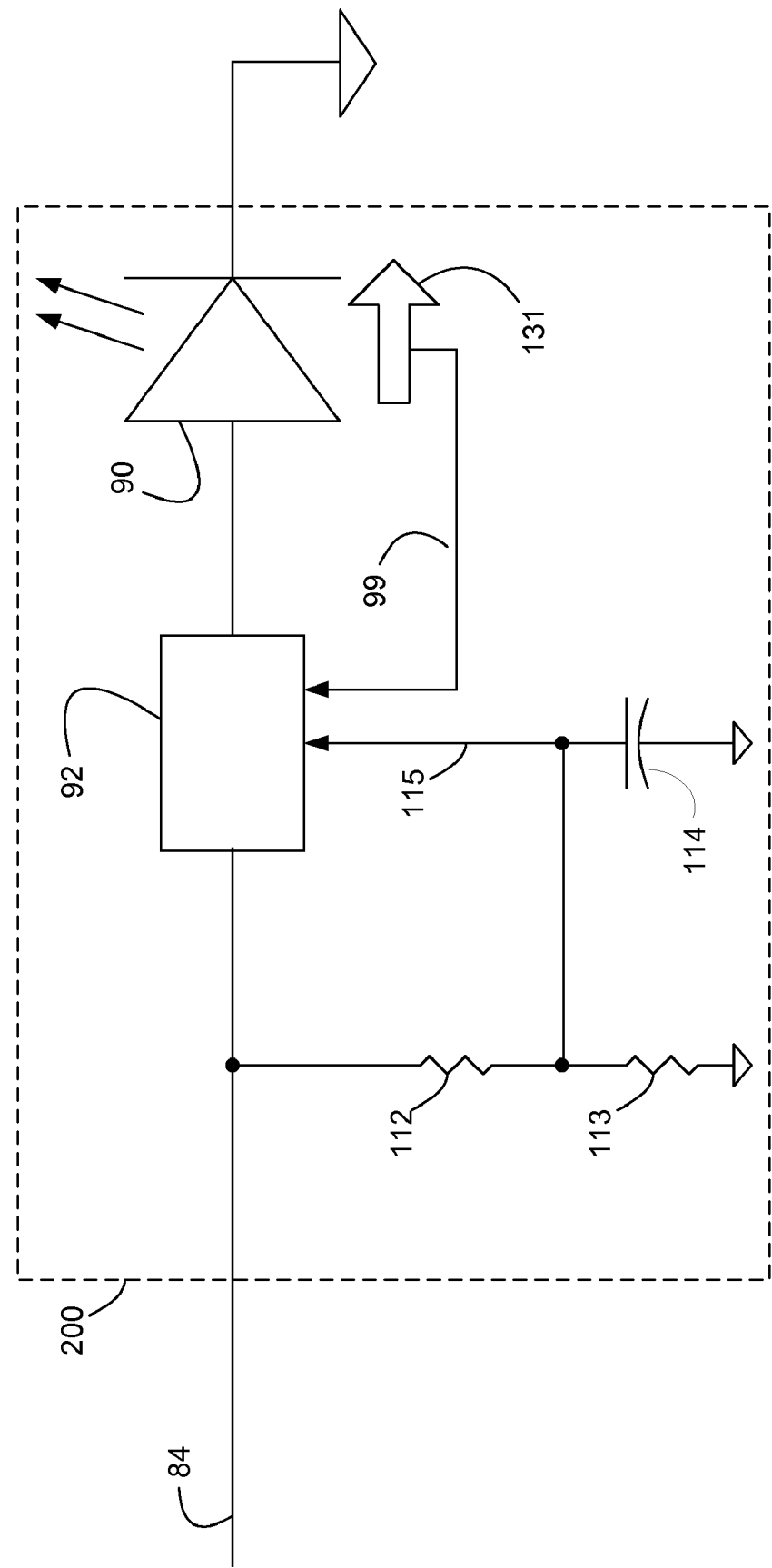
FIG. 12 illustrates the circuit of an LED lamp according to an alternative embodiment of the present invention.

FIG. 12 illustrates the circuit of an LED lamp according to an alternative embodiment of the present invention. The LED lamp 200 described in FIG. 12 adjusts the output light intensity of the LEDs 90 by sensing the average value of lamp input voltage 84. The LED lamp 200 is respondent to all types of lamp input voltage waveforms, including direct current (DC Voltage).

Lamp input voltage 84 is input to LED lamp 200. Lamp input voltage 84 provides the necessary energy supplied to LEDs 90 via LED driver 92, such as that shown in FIG. 11. A bridge rectifier circuit (such as rectifier 91 shown in FIG. 9A) may also be used if the lamp input voltage 84 is AC. Lamp input voltage 84 is input to a circuit made up of resistor 112, resistor 113, and filter capacitor 114. Resistors 112, 113 form a resistive voltage divider which scales the high input voltage 84 to a lower voltage more compatible with the LED driver 92 and LED(s) 90. Capacitor 114 filters AC components of the scaled input voltage, thereby generating a scaled DC voltage signal across resistor 113. The scaled DC voltage signal is used as the LED drive signal 115. LED drive signal 115 is fed into LED driver 92 to dim the LED(s) 90, i.e., the LED drive signal 115 performs functions substantially same as those of the LED drive signal 98 in the embodiment shown in FIGS. 9A, 9B, and 11.

As explained above with reference to FIG. 11, LED driver 92 regulates the LED drive current 131 through LED 90 via drive current feedback signal 99. LED driver 92 can employ PWM or constant current control, as described previously, to achieve the desired light output intensity. In addition to averaging the lamp input voltage 84 using the averaging circuit made up of resistor 112, resistor 113, and filter capacitor 114, the embodiment of FIG. 12 allows for the LED lamp to adjust the light output intensity based on the root mean square ($V_{RMS}$) of the lamp input voltage.

The LED lamps according to various embodiments of the present invention has the advantage that the LED lamp can be a direct replacement of conventional incandescent lamps in typical wiring configurations found in residential and commercial building lighting applications, and that the LED lamp can be used with conventional dimmer switches that carry out dimming by changing the input voltage to the lamps. In addition, galvanic isolation is provided between the AC input voltage and the LED elements.

Upon reading this disclosure, those of skill in the art will appreciate still additional alternative designs for an LED lamp. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A light-emitting diode (LED) lamp, comprising:
   one or more LEDs;
   a rectifier configured to receive an input voltage and provide rectified input voltage;
   a first comparator configured to compare the rectified input voltage with a reference voltage and generate a sensed voltage, said sensed voltage being in a first state while the input voltage is provided and in a second state while the input voltage is not provided due to phase angle switching of the input voltage;
   a dimming factor circuit configured to receive the sensed voltage and generate a control signal indicative of the sensed voltage; and
   an LED driver configured to receive the input voltage and provide regulated current to said one or more LEDs, the LED driver configured to adjust the regulated current to said one or more LEDs based on the control signal to adjust output light intensity of said one or more LEDs.

2. The LED lamp of claim 1, wherein the dimming factor circuit generates the control signal to indicate a pulse width of the sensed voltage in the first state.

3. The LED lamp of claim 2, wherein the dimming factor circuit generates the control signal to have a voltage proportional to the pulse width of the sensed voltage in the first state.

4. The LED lamp of claim 2, wherein the LED driver comprises a flyback power converter, a power switch of the flyback power converter being switched on and off according to the pulse width of the sensed voltage to provide the regulated current to said one or more LEDs.

5. The LED lamp of claim 4, wherein the LED driver further comprises a second comparator configured to compare the control signal with a current sense signal indicative of the regulated current through said one or more LEDs to generate a switch control signal, the switch control signal switching on the power switch of the flyback power converter while the control signal has voltage higher than the current sense signal and switching off the power switch while the control signal has voltage lower than the current sense signal.

6. A method of adjusting output light intensity of one or more LEDs of an LED lamp, the method comprising:
   rectifying an input voltage to the LED lamp;
   comparing the rectified input voltage with a reference voltage to generate a sensed voltage, said sensed voltage being in a first state while the input voltage is provided and in a second state while the input voltage is not provided due to phase angle switching of the input voltage;
   generating a control signal indicative of the sensed voltage; and
   adjusting regulated current to said one or more LEDs based on the control signal to adjust the output light intensity of said one or more LEDs.

7. The method of claim 6, wherein the control signal is generated to indicate a pulse width of the sensed voltage in the first state.

8. The method of claim 7, wherein the control signal is generated to have a voltage proportional to the pulse width of the sensed voltage in the first state.

9. The method of claim 7, wherein said one or more LEDs are driven by a flyback power converter, a power switch of the flyback power converter being switched on and off according to the pulse width of the sensed voltage to provide the regulated current to said one or more LEDs.

10. The method of claim 9, further comprising comparing the control signal with a current sense signal indicative of the regulated current through said one or more LEDs to generate a switch control signal, the switch control signal switching on the power switch of the flyback power converter while the control signal has voltage higher than the current sense signal and switching off the power switch while the control signal has voltage lower than the current sense signal.

11. A lamp device, comprising:
   one or more light-emitting means for emitting light according to current flowing through said light-emitting means; and
   rectifier means for receiving an input voltage and providing rectified input voltage;
   comparator means for comparing the rectified input voltage with a reference voltage and generating a sensed voltage, said sensed voltage being in a first state while the input voltage is provided and in a second state while the input voltage is not provided due to phase angle switching of the input voltage;
   dimming control means for receiving the sensed voltage and generating a control signal indicative of the sensed voltage; and
   driver means for receiving the input voltage and providing regulated current to said one or more light-emitting means, the driver means configured to adjust the regulated current to said one or more light-emitting means based upon the control signal to adjust output light intensity of said one or more light-emitting means.

* * * * *